United States Patent [19]
Howie, Jr.

[11] Patent Number: 5,641,556
[45] Date of Patent: Jun. 24, 1997

[54] METHOD FOR MANUFACTURING A COMPOSITE ARTICLE HAVING A HIGH CLARITY ICON AND THE ARTICLE PRODUCED BY THE METHOD

[75] Inventor: Robert K. Howie, Jr., Decatur, Ill.

[73] Assignee: The Grigoleit Company, Decatur, Ill.

[21] Appl. No.: 583,522

[22] Filed: Jan. 5, 1996

[51] Int. Cl.[6] ........................................ B32B 9/00
[52] U.S. Cl. ...................... 428/195; 428/76; 428/159; 428/161; 428/204; 428/318.8; 428/394; 428/397; 428/690; 264/274; 264/115; 264/113; 264/46.5; 411/82; 411/427
[58] Field of Search ........................ 428/357, 397, 428/288, 256, 204, 237, 690, 913, 76, 318.8, 378, 394, 159, 161; 264/274, 115, 113, 119, 46.5, 46.6, 45.5; 411/82, 427

[56] References Cited

U.S. PATENT DOCUMENTS

| | | |
|---|---|---|
| 2,285,963 | 6/1942 | Gits et al. . |
| 2,831,453 | 4/1958 | Hardesty ........................ 116/129 |
| 3,543,329 | 12/1970 | Gulette et al. ................. 16/121 |
| 4,536,116 | 8/1985 | Murray ........................... 411/82 |
| 4,893,392 | 1/1990 | Stricker et al. . |
| 5,050,269 | 9/1991 | Engstrom et al. .............. 16/118 |

Primary Examiner—Patrick Ryan
Assistant Examiner—Abraham Bahta
Attorney, Agent, or Firm—Dorn, McEachran, Jambor & Keating

[57] ABSTRACT

A method of manufacturing a composite article having a front face containing a visible icon, which front face may be planer or arcuate. The method includes the steps of forming a core having perforate and imperforate portions in the core thereby creating a stencil defining the icon; forming an anvil having supporting surfaces in the shape of the icon and seated in supporting contact with the stencil; and forming the front layer of the article by injection molding an opaque plastic covering the front face of the core except for the imperforate portions of the stencil defining the icon. The composite article includes a core having a front face and a rear face with perforate and imperforate portions of the core forming a stencil defining the icon. An opaque plastic layer is formed on the front face of the core and covers the stencil except for the icon portion thereof. In another embodiment of the composite article, an anvil of a light transmitting plastic is installed having supporting surfaces shaped and sized to provide supporting engagement at the rear face of the core for the imperforate portions of the stencil defining the icon. In this other embodiment, the plastic core is translucent and the opaque plastic of the front layer extends through and interlocks the core and the anvil.

13 Claims, 2 Drawing Sheets

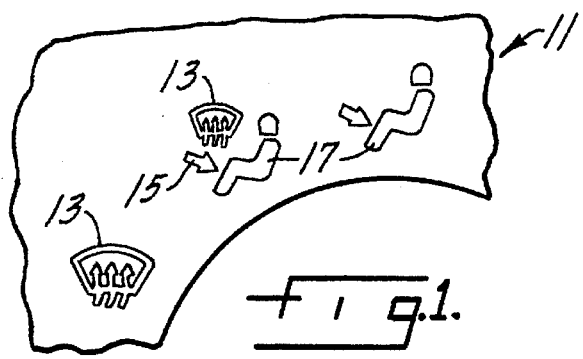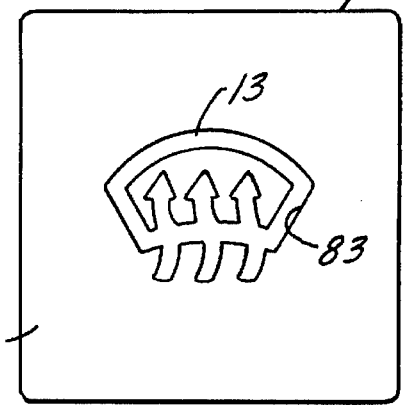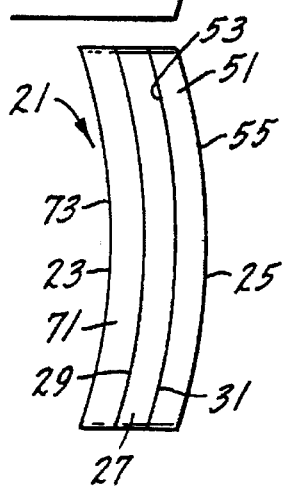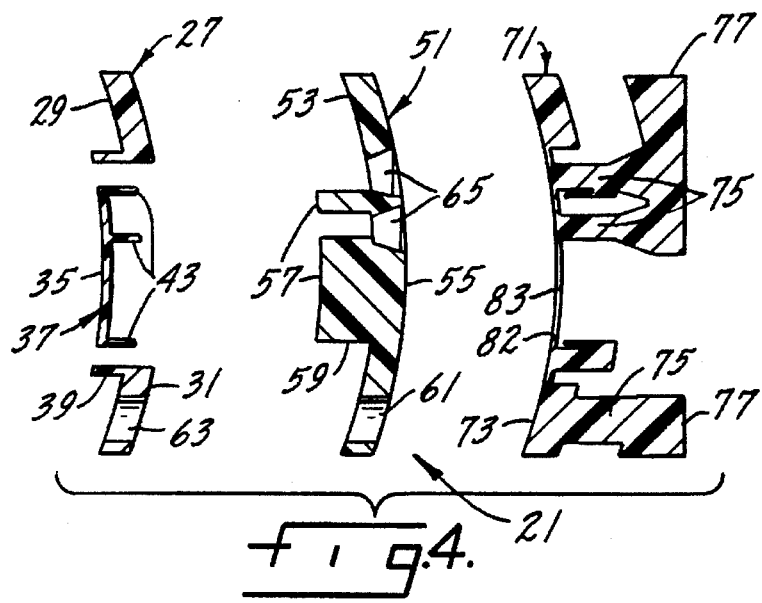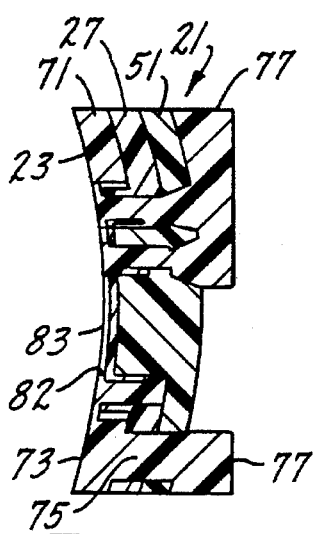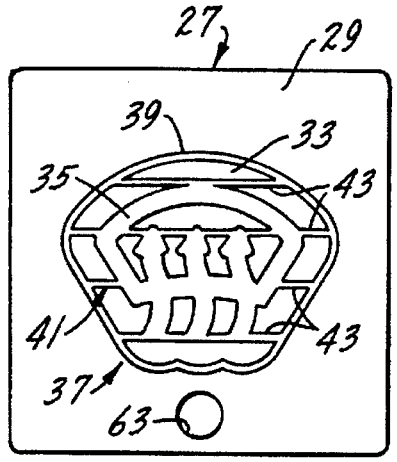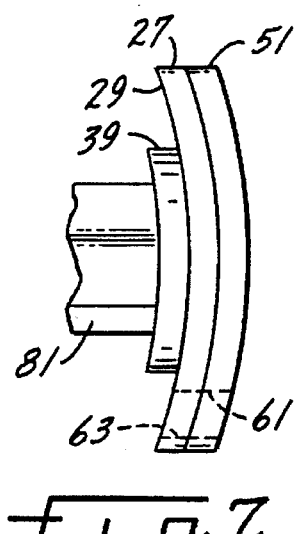

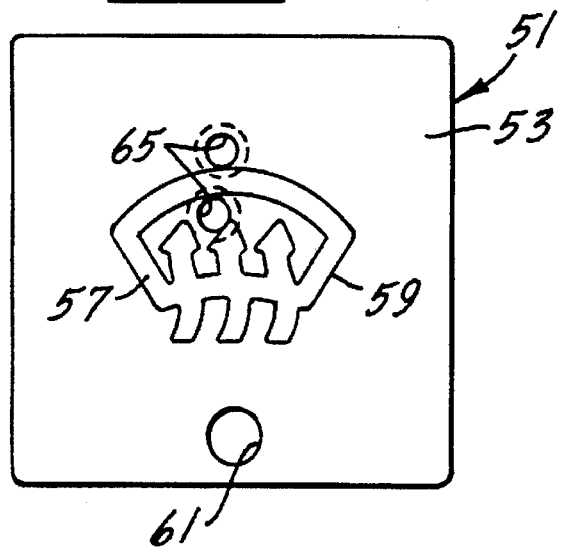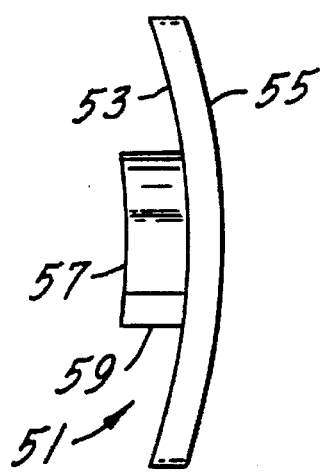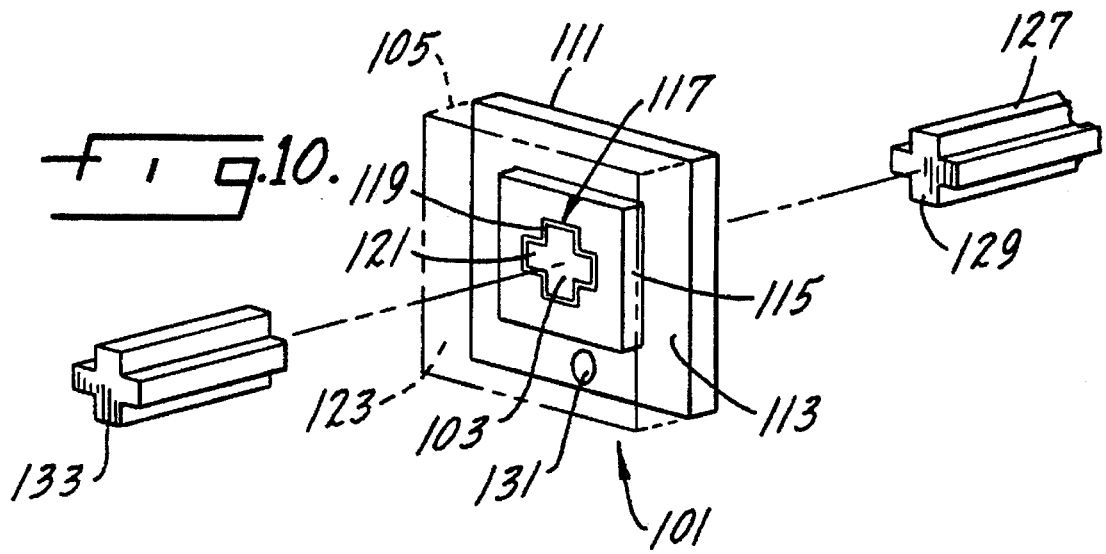

5,641,556

METHOD FOR MANUFACTURING A COMPOSITE ARTICLE HAVING A HIGH CLARITY ICON AND THE ARTICLE PRODUCED BY THE METHOD

BACKGROUND AND SUMMARY OF THE INVENTION

This invention is directed to a method for manufacturing composite plastic articles and the plastic articles themselves which carry finely detailed icons on outer surfaces thereof. The plastic articles made by the method of this invention may include such diverse items as knobs; vehicle, machinery, equipment and appliance control panels and buttons for such panels. The invention includes plastic articles having icons that are visible in reflective light and can also be backlighted for installation in knobs, panels and buttons in vehicles where the icons must be visible during the daylight and at night. The term "icon", as used in this specification and claims, refers not only to functional representational images of the type commonly used in the computer world but also includes letters, numerals, indicator lines, trademarks, logos and symbols of all shapes and sizes which may be perceived by the human eye.

Conventionally, the manufacture of the aforementioned types of knobs, control panels and buttons has required multiple, labor intensive operations. Such operations have included the silk screening of icons on films and the lamination of the films to injection molded plastic parts. Another conventional technique has involved the use of lasers to remove portions of painted coatings from plastic cores to create icons. These labor intensive operations have been considered necessary in order to produce knobs, control panels and buttons having icons of sufficiently fine detail and clarity.

An object of this invention is the manufacture of composite plastic articles having at least one icon which articles can be made entirely from injection molded plastic components.

Another object of this invention are composite plastic articles formed of injection molded components having backlightable icons which are molded to a high degree of definition and clarity.

Still another object of this invention are composite plastic articles having icons provided on non-planer surfaces and particularly on compound curved surfaces.

Yet another object of this invention is a composite plastic article having an icon formed of an extremely thin layer of translucent plastic and supported by an anvil of a light transmitting plastic during finishing operations involving the injection molding of an outer covering.

An additional object of this invention are composite plastic articles having icons positioned on curved surfaces which icons are proportioned so as to be legible in spite of their location on a non-planer surface.

Still an additional object of this invention is a method of injection molding a composite plastic article having an integral icon which matches or exceeds in clarity and in detail icons made by silk screening or laser-paint processes.

Other objects may be found in the following specification, claims and drawings.

BRIEF DESCRIPTION OF THE DRAWINGS

The invention is illustrated more or less diagrammatically in the following drawings wherein:

FIG. 1 is a partial front view of an instrument panel made in accordance with the method of this invention and incorporating the teachings thereof;

FIG. 2 is an enlarged front view of a plastic article such as a button having an icon formed in the curved front face thereof in accordance with the teachings of this invention;

FIG. 3 is a side elevational view of the plastic article of FIG. 2;

FIG. 4 is an exploded cross sectional view of the plastic article of FIG. 2 prior to the removal of sprue portions;

FIG. 5 is a cross sectional view of the plastic article of FIG. 2 prior to the removal of sprue portions;

FIG. 6 is an enlarged front elevational view of the core of the plastic article of FIG. 2 showing the stencil of an icon;

FIG. 7 is a side elevational view showing a step in the method of manufacturing the plastic article of FIG. 2;

FIG. 8 is an enlarged front elevational view of the light transmitting anvil of the plastic article of FIG. 2;

FIG. 9 is a side elevational view of the light transmitting anvil of FIG. 8; and FIG. 10 is a perspective view of one step in the method of manufacturing of a plastic article of this invention having an icon that is not backlighted.

DESCRIPTION OF THE PREFERRED EMBODIMENTS

FIG. 1 of the drawings shows the invention embodied in a panel 11 which, by way of example and not by way of limitation, is shown as a portion of a dashboard of an automobile. The invention can also be embodied in a control panel of a piece of machinery or of an appliance. Formed on the front face of the panel 11 are various icons such as 13 which indicates airflow, 15 which is an arrow and 17 which is a stick figure representation of a seated passenger, all of which are conventional icons. These icons must be visible to the user both in natural light such as in the daytime and under darkened conditions and, therefore, are backlighted. The term "icon" as used in the specification and claims encompasses not only graphic configurations such as those shown in FIG. 1 but also includes letters, numerals, indicator lines, trademarks, logos, symbols and any other type of a representation which conveys information to or can be recognized by a user. Although as shown in FIG. 1, icons 13, 15 and 17 may be located on the face of a control panel, such as panel 11, for simplicity of illustration and explanation, the icon 13 is shown incorporated in a button 21 which itself may be incorporated in a panel or other article of manufacture. For the reasons previously stated, the button 21 has an icon 13 in a shape indicating airflow which icon is also backlighted.

As can be seen most clearly in FIGS. 2, 3, 4 and 5 of the drawings, the method and apparatus of this invention may be employed in producing icon bearing buttons such as button 21 which have the icon formed on a concave surface 23 so that icon does not appear distorted to the viewer who looks at the icon from generally face on. Because the icon is formed in molds and tooling which are originally adapted to the curve of the icon bearing surface, any distortion is automatically compensated for. The button 21 also has a rear convex face 25 and is built around a core 27 which has a front face 29 and a rear face 31. The core as shown in FIG. 6 includes perforate portions 33 and imperforate portions 35 which together create the design of the stencil 37 which defines the icon 13. The stencil is encompassed by a perimeter wall 39 which extends forwardly of the front face 29 of the core as shown most clearly in FIGS. 4 and 7.

The core 27 is formed of a white plastic such as an acetal with its imperforate portions 35 having fine definitions and thicknesses of only slightly more than ten-one thousandths of an inch. A plastic core molded to such fine definitions and minimum dimensions has been obtained by using electrode eroded metal cutting techniques to form the molds and tooling used to create parts such as the core 27, especially the imperforate portions 33 of the stencil 37. The use of electrocrosive metal cutting techniques increases the definition of the portions forming the stencil by eliminating the concave and convex fillets in molds and tools formed by conventional cutting tools. To support the stencil against collapse in later injection molding operations which form the completed button, a screen 41 of plastic is molded integrally with the stencil with the screen in this embodiment consisting of only horizontal members 43 which add strength to the stencil without deterring from the final appearance of the icon that is created by the stencil.

To provide additional support for the stencil 37 during subsequent molding operations, an anvil 51 is provided. The anvil 51 of this embodiment is formed of a light transmitting polycarbonate to enable the anvil to also function as a light pipe to backlight the icon 13. The anvil is formed with a front face 53 and a rear face 55 both of which are curved. The anvil includes supporting surfaces 57 which are essentially of the same size and shape as the imperforate portions 35 of the stencil 37. These supporting surfaces are located at the front face of projections 59 which extend forwardly from the front face 53 of the anvil as is most clearly shown in FIGS. 4, 8 and 9 of the drawings. A large circular passage 61 extends through the anvil and aligns with a circular passage 63 formed in the core 27 when the anvil and core are assembled in a mold. A pair of smaller circular passages 65 extend through the anvil and open into the stencil 37 of the core 27. The molds and tooling used to form the anvil 51 are also created using electrocrosive metal cutting techniques for the reasons previously mentioned.

The front layer 71 of the button 21 is formed of an opaque plastic having a front face 73 and interlocking portions 75 which interconnect and integrate the stencil 37 and anvil 51 into the composite button 21. The opaque plastic which forms the front layer 71 of the button is injected under pressure from the rear of the anvil 51 through a sprue 77. The plastic passes through the aligned passages 61 and 63 in the anvil 51 and core 27 to flow to and cover the front face 29 of the core 27. Additional opaque plastic flows through the circular passages 65 of the anvil 51 into the stencil 37 of the core 27 and through the perforate portions 33 of the core to also form the front layer 71 of the button. The injection of the opaque plastic from the rear of the anvil and core to form a thin front layer 71 of the button without the formation of what are called "weld lines" which may occur when molten plastic is flowed in a thin layer over a relatively wide area. The prevention of weld lines is especially important in the extremely thin layer of plastic which is applied over the front face of the stencil 37 between the perimeter wall 39 and the imperforate portion 35 of the stencil. The injected opaque plastic surrounds the horizontal members 43 of the screen 41 to interlock the front layer 71, core 27 and anvil 51 into a unitary button 21.

To prevent the injected opaque plastic from flowing over and completely covering the imperforate portions 35 of the stencil 37 which form the icon 13, an icon shielding tool 81 is positioned in the mold to engage the imperforate portions 35 of the stencil 37 of the core 27 in the manner shown in FIG. 7. The icon shielding tool has end surfaces which are the same shape, but slightly smaller, than the imperforate portions 35 of the stencil 37 which define the icon 13. This smaller "foot print" of the icon shielding tool provides a border 82, as shown in FIG. 5 of the drawings, around the imperforate portions 35 of the stencil. The icon shielding tool 81 prevents the later injected opaque plastic from flowing over and filling in an opening 83 at the front face 73 of the finished button in the shape of the icon 13 while allowing the opaque plastic to form the narrow border 82 around the icon. The thin narrow border 82 surrounds the icon 13 to tightly encapsulate the stencil 37 while still sharply delineating the icon 13.

FIG. 10 of the drawings shows a step in the method of making a plastic article in the shape of a button 101 having an icon 103 in the form of a cross visible from the front face 105 of the button. While the icon is shown as a cross, it should be understood and appreciated that this is a simplified representational of any icon that can be formed by this process and its simplicity does not mean more complex designs, such as the icon 13 previously described, cannot be made by the same method. Since this button is intended for service where backlighting is not needed, a light transmitting anvil, such as anvil 51, is not provided.

The button 101 includes a core 111 having a front face 113. A perimeter wall 115 extends forwardly of the face 113 of the core and surrounds a stencil 117. The stencil includes a perforate portion 119 and an imperforate portion 121 defining the cross-shaped stencil. A screen, not shown, having horizontal and vertical members to strengthen the stencil may be used but these members are not shown in the drawings. To support the stencil during the injection of the opaque molded plastic which forms the front layer 123 of the button, a tool steel anvil 127 having supporting surfaces 129 in the shape of the icon 103 is positioned with its supporting surfaces against the imperforate portions 121 of the stencil. When the opaque plastic, which provides the front layer 123 of the button, is injection molded from the rear of the core it flows through the perforate portions 119 of the stencil and a passage 131 in the core. To prevent the opaque plastic from covering the icon 103 except, of course, for a narrow border around the icon where the opaque plastic overflows the imperforate portion 121 of the stencil 117, an icon shielding tool 133 engages the imperforate portion 121 of the stencil on the front face of the core so that the opaque front layer 123 does not flow over the icon.

In the embodiments of the invention herefor discussed, the cores have been described as formed of a plastic of a single color such as a translucent white, at least when backlighting is to be provided. However, the invention is not so limited. The core may be molded in sections of different colors. Alternately, the core may be molded of material of one color and a different color may be applied to the imperforate portions of the stencil which define the icon, either on the front or rear face of these imperforate portions. When backlighting is not a consideration, the core need not be formed of a translucent material nor need it be formed of a plastic material, because in some applications of the invention the core may be made of a suitable metal. Thus, the scope of the invention should be limited only by the claims appended hereto.

I claim:

1. A method of manufacturing a composite article having a front face and a rear face with at least one icon visible at said front face, including the steps of:

forming a core having a front face and a rear face with perforate and imperforate portions of said core forming a stencil defining said icon, forming an anvil having supporting surfaces in the shape of said icon and dimensioned to seat on said rear face of said core in supporting engagement with said stencil defining said icon, and forming said front face of said composite article by injection molding an opaque plastic layer over said front face of said core except for at least a substantial portion of said stencil defining said icon.

2. The method of claim 1 including the step of injection molding said opaque plastic layer over said front face of said core to form a narrow border around said portion of said stencil defining said icon.

3. The method of claim 1 in which said opaque plastic layer is injection molded through said core.

4. The method of claim 3 including the further step of interlocking said anvil with said injection molded opaque plastic.

5. The method of claim 1 in which said core is formed of plastic.

6. The method of claim 5 in which said plastic core is formed of a translucent material and said anvil is formed of a light transmitting plastic.

7. The method of claim 6 in which said opaque layer is injection molded through said core and said anvil.

8. The method of claim 1 in which said step of forming said front face of said composite article is combined with the step of positioning a tool having supporting surfaces in the shape of said icon in supporting engagement with the imperforate portion of said front face of said stencil defining said icon.

9. A composite article having an icon on the front face thereof, said article including:

a core having a front face and a rear face with perforate and imperforate portions of said core forming a stencil defining said icon, and an opaque plastic layer formed on said front face of said core covering said stencil except for substantially all of said icon portion thereof with said opaque plastic extending through said core.

10. The composite article of claim 9 in which said opaque plastic layer formed on said front face of said core forms a narrow border around said icon portion thereof.

11. The composite article of claim 9 in which said core is formed of plastic.

12. The composite article of claim 11 further including an anvil of a light transmitting plastic having supporting surfaces in the shape of said icon and dimensioned to seat in supporting engagement with the imperforate portion of said stencil defining said icon on said rear face of said core.

13. The composite article of claim 12 in which said opaque plastic forming said front layer extends through and interlocks said core and said anvil.

* * * * *

UNITED STATES PATENT AND TRADEMARK OFFICE
CERTIFICATE OF CORRECTION

PATENT NO. : 5,641,556
DATED : June 24, 1997
INVENTOR(S) : Robert K. Howie, Jr.

It is certified that error appears in the above-identified patent and that said Letters Patent is hereby corrected as shown below:

Column 3, line 7, delete "electrocrosive" and insert --electroerosive--.

Column 3, line 34, cancel "electrocrosive" and insert --electroerosive--.

Signed and Sealed this

Fifth Day of May, 1998

Attest:

BRUCE LEHMAN

Attesting Officer

Commissioner of Patents and Trademarks